United States Patent
Kennedy, Sr.

(10) Patent No.: US 8,025,015 B1
(45) Date of Patent: Sep. 27, 2011

(54) VEHICLE WORKSTATION

(76) Inventor: Mark B. Kennedy, Sr., York, PA (US)

( * ) Notice: Subject to any disclaimer, the term of this patent is extended or adjusted under 35 U.S.C. 154(b) by 0 days.

(21) Appl. No.: 12/759,140

(22) Filed: Apr. 13, 2010

(51) Int. Cl.
*A47B 23/00* (2006.01)

(52) U.S. Cl. ............ 108/44; 108/152; 108/49; 248/562; 248/638

(58) Field of Classification Search ............ 108/49, 108/42, 44, 45, 152; 248/562, 568, 638
See application file for complete search history.

(56) References Cited

U.S. PATENT DOCUMENTS

| | | | | |
|---|---|---|---|---|
| 1,046,479 | A | * | 12/1912 | McPherson ............ 108/49 |
| 1,797,847 | A | * | 3/1931 | Vandagriff ............ 108/49 |
| 1,862,237 | A | * | 6/1932 | Pepler ............ 108/49 |
| 1,894,991 | A | * | 1/1933 | Hayes ............ 108/49 |
| 2,026,011 | A | * | 12/1935 | Wright ............ 108/49 |
| 2,214,516 | A | | 9/1940 | Vernon |
| 2,460,244 | A | * | 1/1949 | Strauss ............ 108/49 |
| 2,535,112 | A | * | 12/1950 | Woody ............ 108/49 |
| 2,692,806 | A | * | 10/1954 | Grace ............ 108/49 |
| 2,710,051 | A | * | 6/1955 | Greenberg ............ 108/49 |
| 2,804,278 | A | | 8/1957 | Jewett |
| 3,543,312 | A | * | 12/1970 | Giancarlo ............ 108/49 |
| 3,550,001 | A | | 12/1970 | Hanley |
| 4,687,167 | A | | 8/1987 | Skalka et al. |
| 4,981,243 | A | * | 1/1991 | Rogowski ............ 224/431 |
| 5,022,626 | A | | 6/1991 | Nozel et al. |
| 5,429,336 | A | | 7/1995 | Ko |
| 5,485,793 | A | | 1/1996 | Crowell |
| 5,690,307 | A | * | 11/1997 | Joyce ............ 248/274.1 |
| 5,769,369 | A | | 6/1998 | Meinel |
| 5,893,607 | A | * | 4/1999 | Trimnell ............ 108/49 |
| 5,911,395 | A | * | 6/1999 | Hussaini ............ 248/206.3 |
| 5,931,102 | A | * | 8/1999 | Grahl ............ 108/42 |
| 6,168,126 | B1 | | 1/2001 | Stafford |
| 6,378,815 | B1 | * | 4/2002 | Lee ............ 248/121 |
| 6,381,133 | B1 | | 4/2002 | Chen |
| 6,470,809 | B1 | | 10/2002 | Herbert |
| 7,082,882 | B2 | * | 8/2006 | Heimbrock ............ 108/49 |
| 7,233,487 | B2 | | 6/2007 | Stinson |
| 2007/0034753 | A1 | | 2/2007 | Lee |
| 2009/0272866 | A1 | | 11/2009 | Solomovitz |

OTHER PUBLICATIONS

Chicago Mounts webpage available at http://chicagomounts.com/RAM-VB-168-SW1.htm, dated 2007.

* cited by examiner

*Primary Examiner* — Jose V Chen
(74) *Attorney, Agent, or Firm* — Hooker & Habib, P.C.

(57) ABSTRACT

A vehicle workstation for mounting laptop computers and other equipment inside a vehicle that is easily attached to and removed from the vehicle and prevents vehicle vibrations and jolts from being transmitted to the equipment.

16 Claims, 7 Drawing Sheets

VEHICLE WORKSTATION

FIELD OF THE INVENTION

The invention relates to workstations mounted in vehicles for supporting laptop computers and other equipment for use by the vehicle operator.

BACKGROUND OF THE INVENTION

Vehicle workstations are commonly used in delivery trucks to allow drivers to keep track of delivery routes, in police vehicles to allow officers access to electronic records and in other vehicles for like applications.

Conventional vehicle workstations include a base mounted to a vehicle dashboard or other internal vehicle fixture and one or more position-adjustable support members extending from the base to an equipment support plate on which display equipment is mounted. The workstation is usually mounted on the passenger side of a vehicle next to the driver.

A common problem with conventional workstations is that jolts and vibrations generated during vehicle operation are transmitted from the vehicle to the display equipment. The vibrations make it difficult for an operator to view the display. As the vehicle idles, the vehicle engine creates vibrations that are transmitted to internal vehicle fixtures and any equipment mounted to the fixtures. This effect is greatly amplified when a vehicle is suddenly stopped or maneuvered over rough roads as jolts are transmitted to the vehicle fixtures and any equipment mounted to the fixtures.

Additionally, the vibrations and jolts disrupt the position of the adjustable support members, requiring re-adjustment of the support members by the driver. The driver must reach from the driver-side of the vehicle to the passenger-side of the vehicle. Repeated re-adjustments can cause strain and injury to the driver.

Conventional vehicle workstations are mounted on vehicle fixtures by drilling fastener holes through the fixtures or otherwise permanently altering the vehicle interior. This is undesirable as the vehicle owner may prohibit permanent vehicle alterations and considerable time may be needed to install the workstation into a vehicle. These problems are amplified when drivers are called to switch between different work vehicles within a work schedule, requiring the driver to remove the workstation from one vehicle and re-install it in a new vehicle before work is resumed. It is also a problem if the driver is called to take on a passenger to sit in the passenger side of the vehicle as the workstation must be removed before the passenger can properly ride in the vehicle.

SUMMARY OF THE INVENTION

The invention is a vehicle workstation for mounting display equipment in a vehicle, preferably on the passenger-side of the vehicle across from the driver. The workstation is easily attached to and removed from existing vehicle fixtures, does not require permanent alteration to the vehicle interior for attachment and includes a shock absorber assembly which isolates the display equipment mounted on the workstation from vehicle vibrations and jolts to permit the driver to view the display equipment despite vibrations and jolts.

The workstation includes a base that is attached to the interior of the vehicle and one or more support members extending from the base to an equipment support plate. A shock absorber assembly is located between adjacent rigid workstation members to prevent transmission of vehicle vibrations and jolts along the support members to the equipment support plate. The size of the support members can be adjusted to meet specific vehicle dimensions and user needs.

In one embodiment, the workstation base includes a clamp assembly adapted to engage a portion of a seat on the passenger side of the vehicle. If a passenger needs to ride in the passenger side seat, the support members are easily removed from the base and the seat may be used while the base remains mounted to the seat. The clamp assembly allows workstation mounting without drilling holes or making other permanent alterations to the vehicle interior.

The base includes a base sleeve into which a shaft extending downward from a lower support member is extended. The shock absorber assembly is located between the base sleeve and the mounting shaft to reduce or prevent metal-to-metal contact between the sleeve and the mounting shaft. This greatly dampens or prevents the transmission of vibrations and jolts between the workstation members and isolates the equipment support plate and equipment on the plate from vibrations and shocks.

Other objects and features of the invention will become apparent as the description proceeds, especially when taken in conjunction with the accompanying drawing sheets illustrating the invention.

DESCRIPTION OF THE PREFERRED EMBODIMENTS

Vehicle workstation 10 is mounted to an internal vehicle fixture, such as a seat rail 12. Seat rail 12 is a thin, elongate rail that is part of the external metal framing found in conventional "air-ride" type seats.

Figure 5:
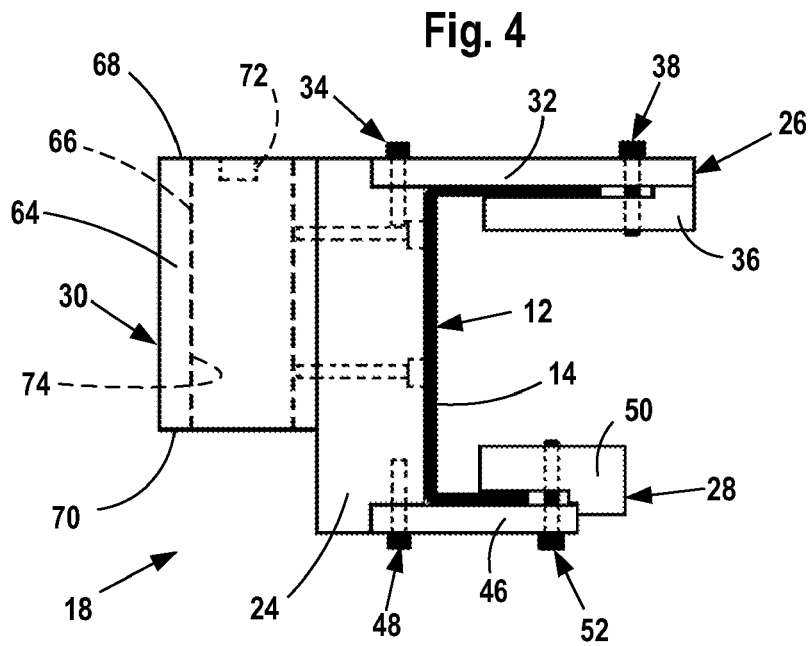
FIG. 5 is a partially exploded side view of a first embodiment mounting base.
Figure 6:
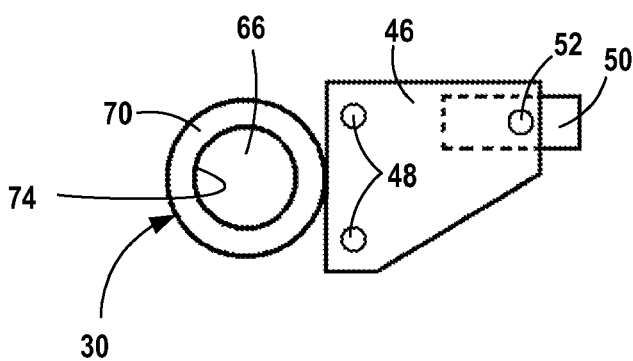
FIG. 6 is a bottom view of a first embodiment mounting base.
Figure 8:
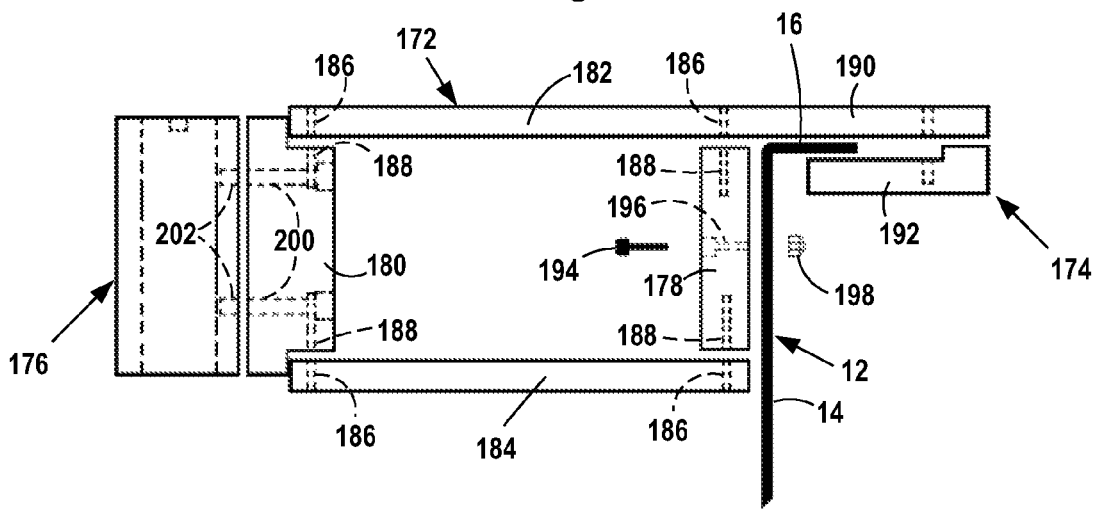
FIG. 8 is a partially exploded side view of the second embodiment mounting base.

Seat rail 12 has a body 14 that extends generally perpendicularly to the floor of the vehicle and one or two arms 16 that extend generally parallel to the floor of the vehicle so that the rail body and arms form a generally C-shape in two-arm variants or a generally L-shape in one-arm variants as illustrated in FIGS. 5 and 8.

Alternatively, the workstation can be mounted to other like internal vehicle fixtures.

Vehicle workstation 10 includes a mounting base 18, a support assembly 20 joined to the base and equipment support plate 22 joined to the support assembly.

Mounting base 18 has a body 24, top and bottom clamp assemblies 26 and 28 on one side of the body and a mounting member 30 on the other side of the body.

Top clamp assembly 26 has a mounting plate 32 joined to body 24 by a pair of threaded fasteners 34 and a clamp plate 36 joined to the mounting plate by a pair of threaded fasteners 38. Plates 32 and 36 make flush contact at plate contact surfaces 40 and 42 located adjacent threaded fasteners 34 to assure a secure connection between plates 32 and 36 when joined.

Plates 32 and 36 define an elongate clamp slot 44 adapted to receive a rail arm 16.

Bottom clamp assembly 28 has a mounting plate 46 joined to body 24 by a pair of threaded fasteners 48 and a clamp plate 50 joined to the mounting plate by a threaded fastener 52. Plates 46 and 52 make flush contact at plate contact surfaces 54 and 56 located adjacent threaded fastener 52 to assure a secure connection between plates 46 and 50 when joined.

Plates 46 and 50 define an elongate clamp slot 58 adapted to receive a rail arm 16.

Figure 1:
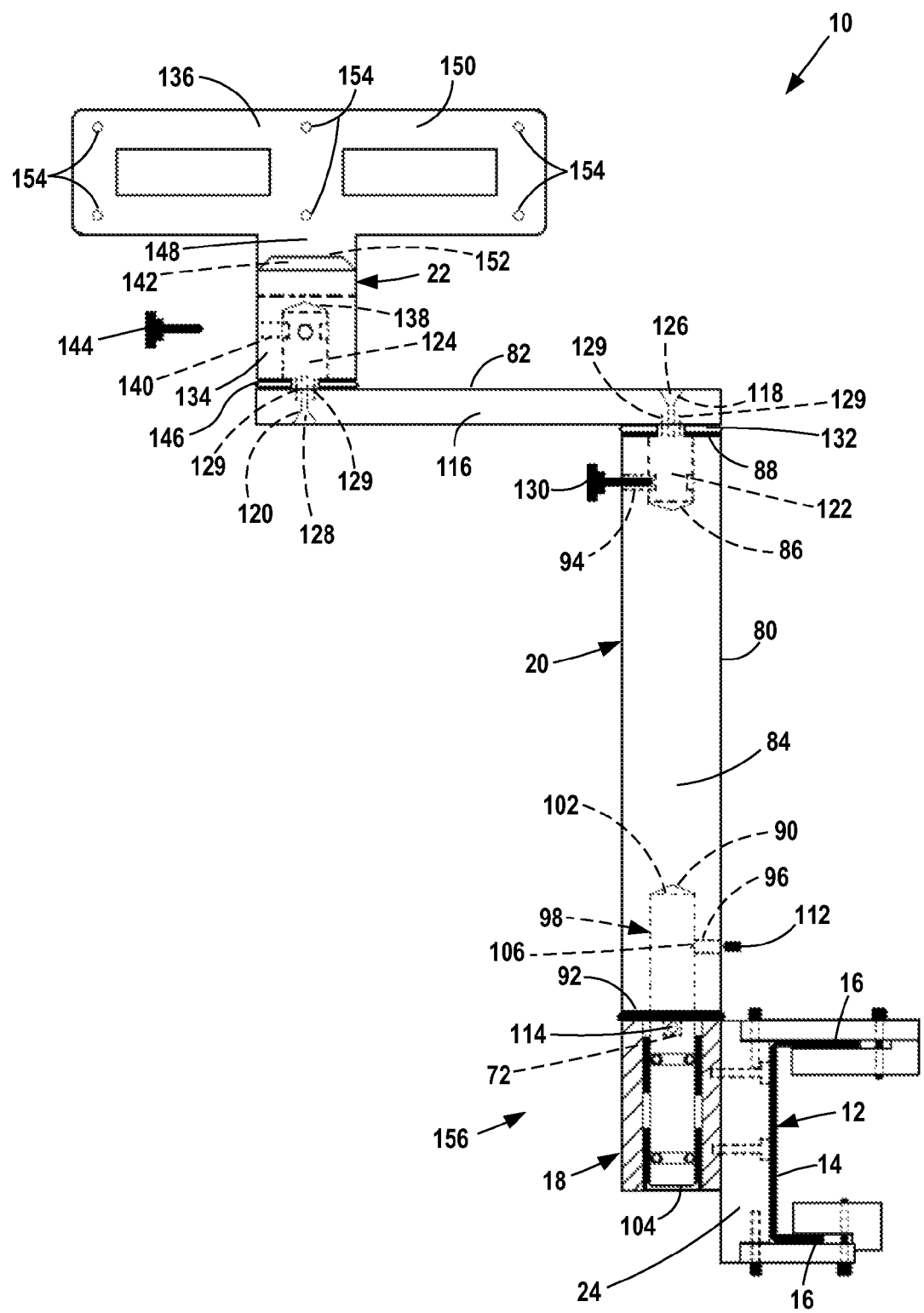
FIG. 1 is a perspective view of a first embodiment vehicle workstation of the present invention.
Figure 2:
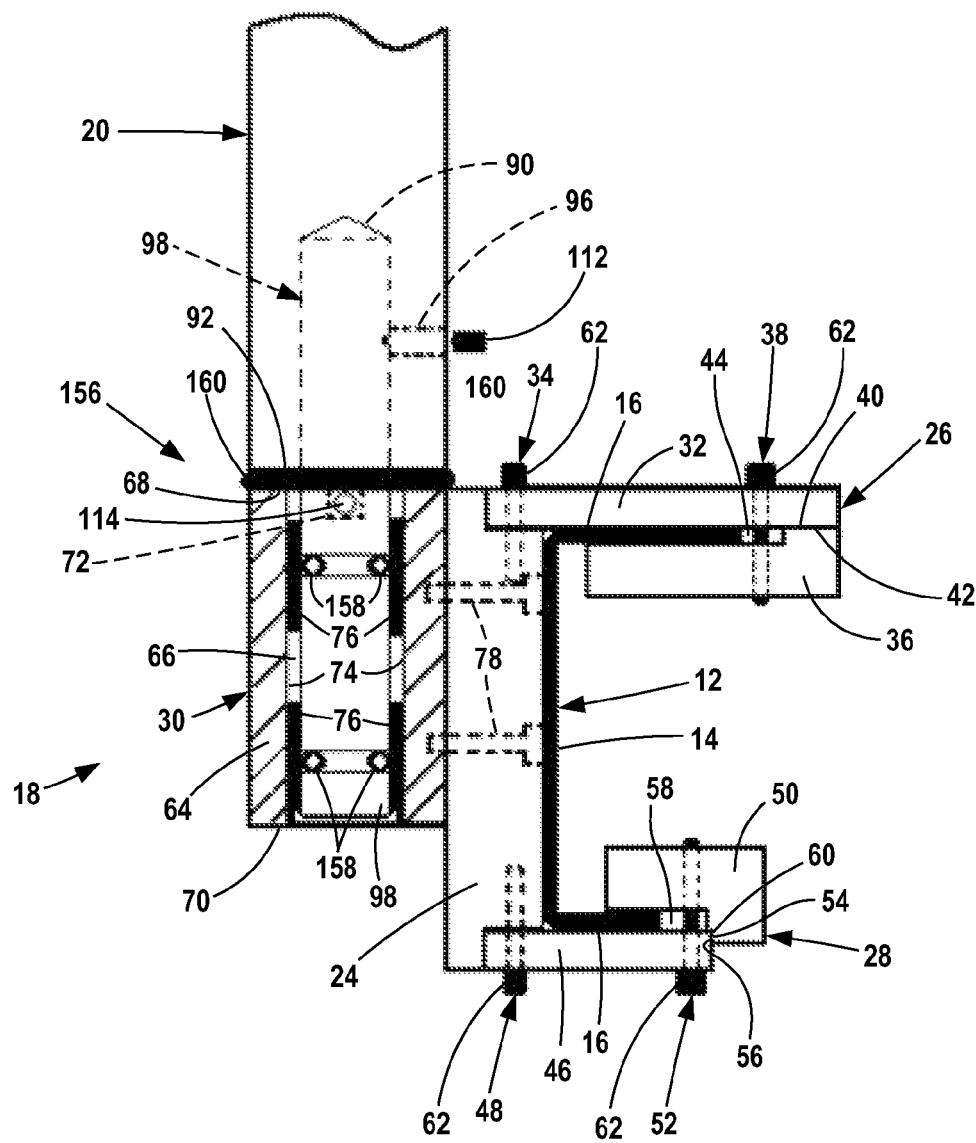
FIG. 2 is a partial sectional view of a lower support member and mounting base in the first embodiment mounting assembly.

As shown in FIG. 2, contact surfaces 54 and 56 further engage each other at a notch 60. Notch 60 allows a user to properly align plates 46 and 50 by feel when assembling bottom clamp assembly 28 to a seat rail 12 to that contact surfaces 54 and 56 are fully engaged with one another. This is useful when elements of assembly 28 are obscured from view by a portion of the seat to which seat rail 12 is attached. Additionally, notch 60 prevents plate 50 from turning with respect to plate 46 when fastener 52 is tightened.

Threaded fasteners 34, 38, 48 and 52 include a head 62 adapted to receive a hex key Allen wrench or like tightening tool. Cap head 62 allows a user to initially tighten the fasteners in clamp assemblies 26 and 28 by-hand to secure them in place to rail 12 before full tightening by a wrench or like tool.

Top and bottom clamp assemblies 26 and 28 are adapted to engage a two-arm, C-shaped seat rail 12.

Mounting member 30 has a body 64 including a vertical mounting aperture 66 extending from body top surface 68 to body bottom surface 70. Slot 72 extends at least partially across the top of body 64 at top surface 68 and intersects aperture 66.

Mounting aperture 66 has an interior surface 74 and may include one or more sleeve bearings 76 mounted to the interior surface 74. Bearings 76 are designed to withstand wear from contact with other support assembly elements and may be brass.

Mounting member 30 is mounted to body 24 by threaded fasteners 78.

Support assembly 20 extends from base 18 to support plate 22 and includes lower support member 80 and upper support member 82.

Lower support member 80 includes an elongate, vertical body 84 having a top aperture 86 extending through body top surface 88 and a bottom aperture 90 extending through body bottom surface 92. Top and bottom fastener apertures 94 and 96 extend through body 84 to top and bottom apertures 86 and 90 respectively.

Mounting post 98 has a generally cylindrical body 100 extending from post top 102 to post bottom 104, a notch 106 proximate post top 102, a post hole 108 extending through body 100 and located approximately mid-way between the post top and post bottom, and one or more circumferential depressions 110 extending around the post and located between post hole 108 and post bottom 104.

Mounting post 98 is joined to lower support member 80 by extending post top 102 into lower support member bottom aperture 90 so that notch 106 is aligned with bottom fastener aperture 96 and then extending threaded fastener 112 into bottom fastener aperture 94 so that fastener 112 engages notch 106.

Mounting post 98 is joined to lower support member 80 so that post hole 108 is located outside bottom aperture 90 proximate support member bottom surface 92. Pin 114 extends through post hole 108. When mounting post 96 is extended into mounting aperture 66, pin 114 is located in slot 72. Pin 114 limits rotation of lower support member 80 relative to mounting aperture 66 and base 18.

The fit between pin 114 and slot 72 is relatively loose. Post hole 106 is located in post 96 so that pin 114 does not engage the bottom of slot 72. While the loose fit is sufficient to prevent rotation of lower support member 80 relative to mounting member 30, the loose fit does not permit transmission of vibrations from base 18 to post 98 and support assembly 20.

Upper support member 82 includes an elongate, horizontal body 116 having apertures 118 and 120 extending through the body at either end of upper support member 82.

Pivot shafts 122 and 124 are jointed to upper support member 82 by fasteners 126 and 128 extended through apertures 118 and 120 respectively. A pair of fasteners 129 may be located adjacent apertures 118 and 120 and extended into pivot shafts 122 and 124 and upper support member 82 to additionally secure pivot shafts 122 and 124 to upper support member 82. In a preferred embodiment, fasteners 129 are spring tension pins.

Upper support member 82 is joined to lower support member 80 by extending pivot shaft 122 into lower support member top aperture 86. Knob fastener 130 is extended through lower support member top fastener aperture 94 to engage pivot shaft 122. When tightened, knob fastener 130 prevents rotation of the upper support member relative to the lower support member. A bearing ring 132 may be placed between the upper and lower support members to lower friction between the supports and allow smooth rotational movement before tightening knob fastener 130.

Support plate 22 includes plate mounting member 134 and plate body 136. Support plate mounting member 134 has a bottom aperture 138, a fastener aperture 140 and an engagement surface 142.

Upper support member 82 extends horizontally from lower support member 80 to support plate mounting member 134. Plate mounting member 134 is joined to upper support member 82 by extending pivot shaft 124 into bottom aperture 138. Knob fastener 144 is extended through fastener aperture 140 to engage pivot shaft 124. When tightened, knob fastener 144 prevents rotation of plate mounting member 134 relative to the upper support member. A bearing ring 146 may be placed between the upper support members and the plate mounting member to lower friction between the elements and allow smooth rotational movement before tightening knob fastener 144.

Plate body 136 includes a base 148 and a mounting face 150. Base 148 includes an aperture 152 that engages engagement surface 142 to join plate body 136 to plate mounting member 134.

Mounting face 150 includes face mounting holes 154 to allow mounting a laptop computer or other equipment to plate 22 by use of conventional fasteners extended though holes 154 and the equipment. Alternatively, hooks and loops fasteners, adhesives, straps or other attachment means may be used to attach electronic equipment to plate 22.

Shock absorber assembly 156 is located proximate mounting post 98 and mounting aperture 66 and is made up of first shock absorber sub-assembly 158 and second shock absorber sub-assembly 160. First shock absorber sub-assembly 158 may be made up of one or more elastomeric O-rings 158. Second shock absorber sub-assembly 160 may be an elastomeric collar 160. O-rings 158 are mounted around post 98 in circumferential depressions 110 and engage interior surface 74 and/or sleeve bearings 76 of mounting aperture 66 when post 98 is placed in the aperture. Collar 160 surrounds the top of post 98 between mounting member body top surface 68 and lower support member bottom surface 92.

When post 98 is placed in mounting aperture 66, first shock absorber sub-assembly 158 prevents contact between post 98 and interior surface 74 and/or sleeve bearings 76 and second shock absorber sub-assembly 160 prevents contact between mounting member body top surface 68 and lower support member bottom surface 92.

Elastomeric O-rings 158 and elastomeric collar 160 may be made of rubber or a similar elastomeric substance.

Shock absorber assembly 156 prevents mounting member 30 from coming in contact with lower support member 80 and 13 post 98 thus preventing vibrations and jolts from being transmitted from base 18 to support assembly 20.

Figure 3:
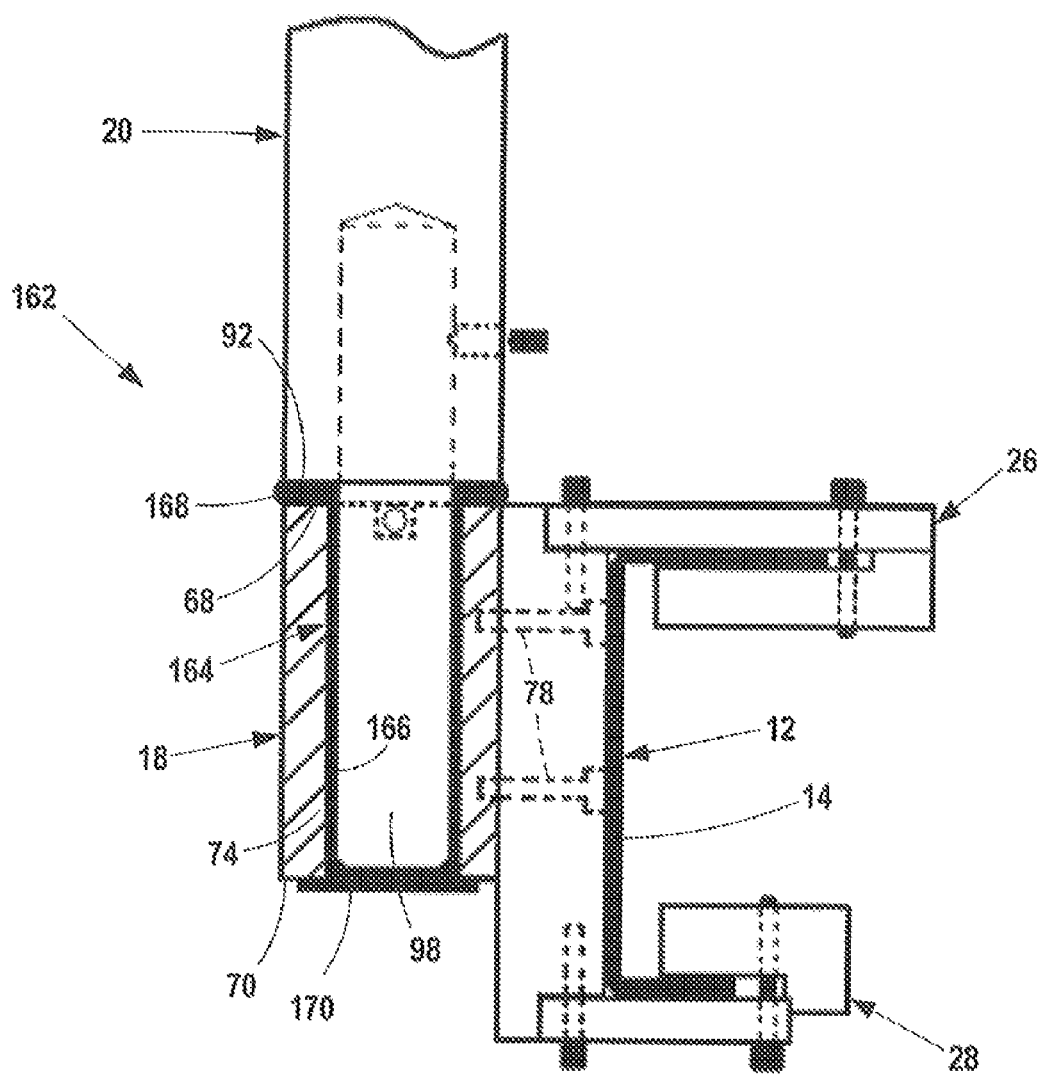
FIG. 3 is a partial cutaway view life FIG. 2 showing a second embodiment shock absorber assembly.
Figure 4:
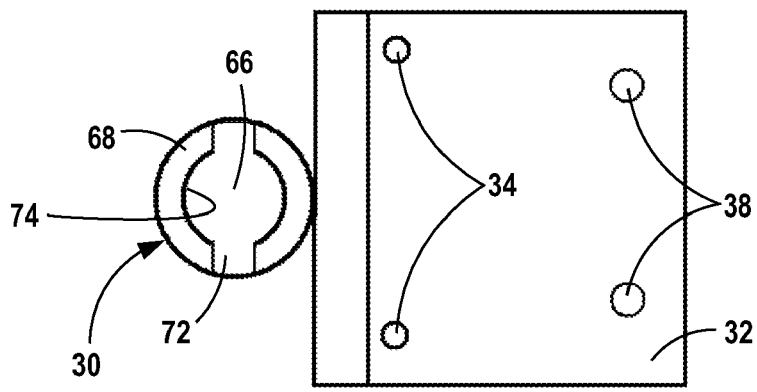
FIG. 4 is a top view of a first embodiment mounting base.

FIG. 3 illustrates an alternate embodiment shock absorber assembly 162 made up of a first shock absorber sub-assembly 164 which may be an elastomeric sleeve 164 having a sleeve body portion 166 and second shock absorber sub-assembly 168 which may be a collar 168 and a sleeve base 170 located away from collar portion 168. As shown in FIG. 3, first and second shock absorber sub-assemblies 164, 168 are one continuous piece. Elastomeric sleeve 164 is placed into mounting aperture 66 so that body portion substantially engages mounting aperture interior surface 74, collar portion engages body top surface 68 and sleeve base 170 engages body bottom surface 70. First shock absorber subassembly 164 prevents contact between post 98 and interior surface 74 and/or sleeve bearings 76 and second shock absorber sub-assembly 168 prevents contact between mounting member body top surface 68 and lower support member bottom surface 92 to preventing vibrations and jolts from being transmitted from base 18 to support assembly 20. Sleeve base 170 prevents elastomeric sleeve 164 from becoming dislodged from mounting aperture 66 when post 98 is removed from mounting base 18.

In alternate embodiments, the shock absorber assembly may include an elastomeric sleeve having a body surrounding post 98 and a separate elastomeric collar surrounding the top of post 98 between mounting member body top surface 68 and lower support member bottom surface 92 like collar 160 described above.

Figure 7:
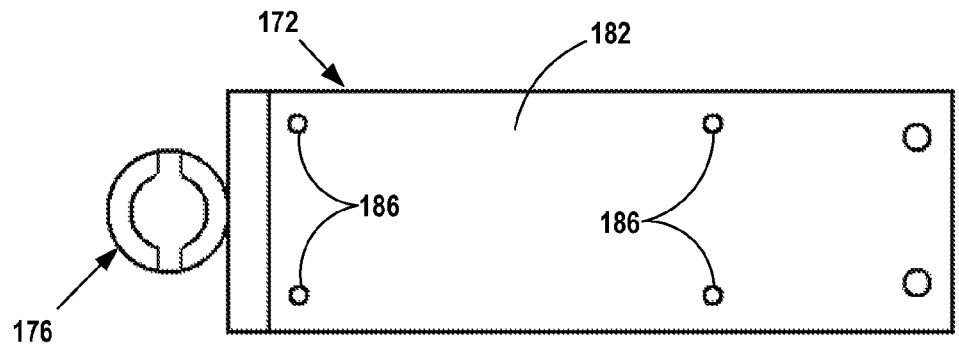
FIG. 7 is a top view of a the second embodiment mounting base.
Figure 9:
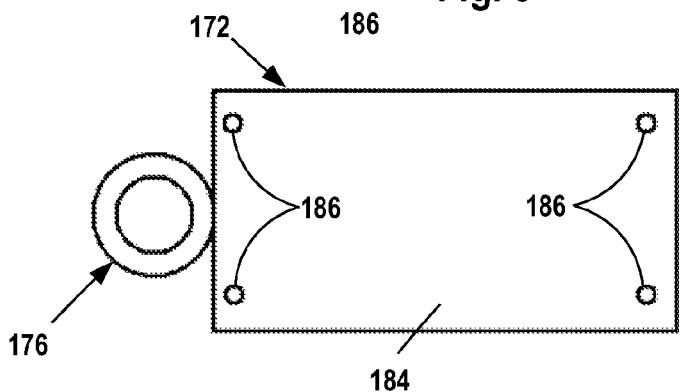
FIG. 9 is a bottom view of the second embodiment mounting base.

FIGS. 7 through 9 illustrate an alternate embodiment mounting base 172 having a clamp assembly 174 on one side of the base and a mounting member 176 on the other side of the base. Base 172 is adapted to engage a one-arm, L-shaped seat rail 12.

Base 172 is made up of blocks 178 and 180 mounted to top and bottom plates 182 and 184 by threaded fasteners passed through plate holes 186 and block holes 188.

Clamp assembly 174 is located proximate block 178 and has a mounting plate 190 extending from top plate 182 away from body block 178 and a clamp plate 192 joined to the mounting plate and is substantially similar to top clamp assembly 26 described above.

Clamp assembly 174 may include a rail fastener 194 passed through rail fastener hole 196 in block 178 and an aperture in rail body 14 to secure rail 12 to clamp assembly 174. Fastener 194 may be a bolt used with nut 198.

If desired, block 178 be mounted to rail 12 by fastener 194 alone.

Mounting member 176 is joined to block 180 by fasteners extended into block apertures 200 and mounting member apertures 202 and is substantially similar to mounting member 64 described above.

Figure 10:
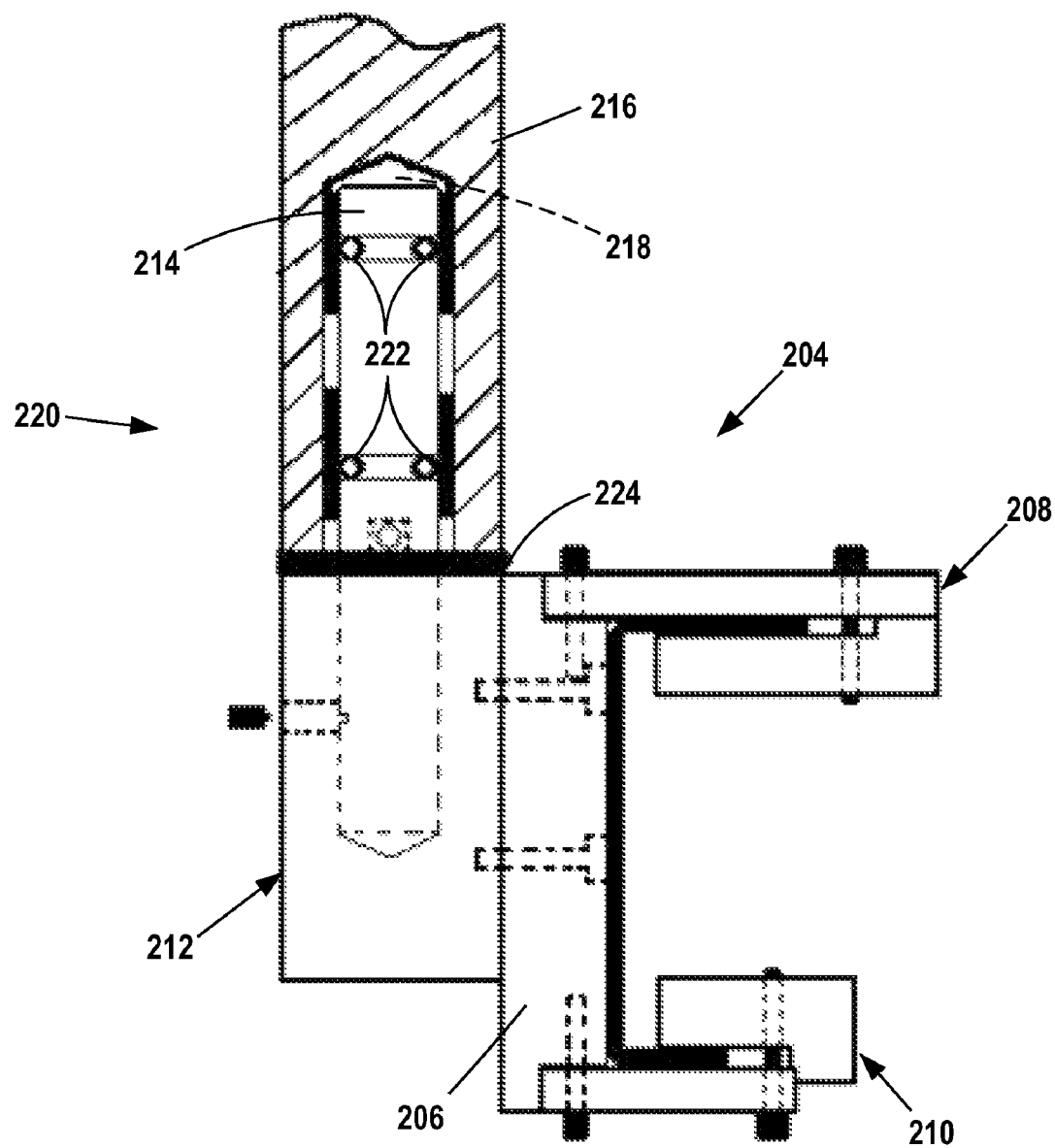
FIG. 10 is a partial sectional view like FIGS. 2 and 3 showing an alternate mounting base and a lower support member.
Figure 11:
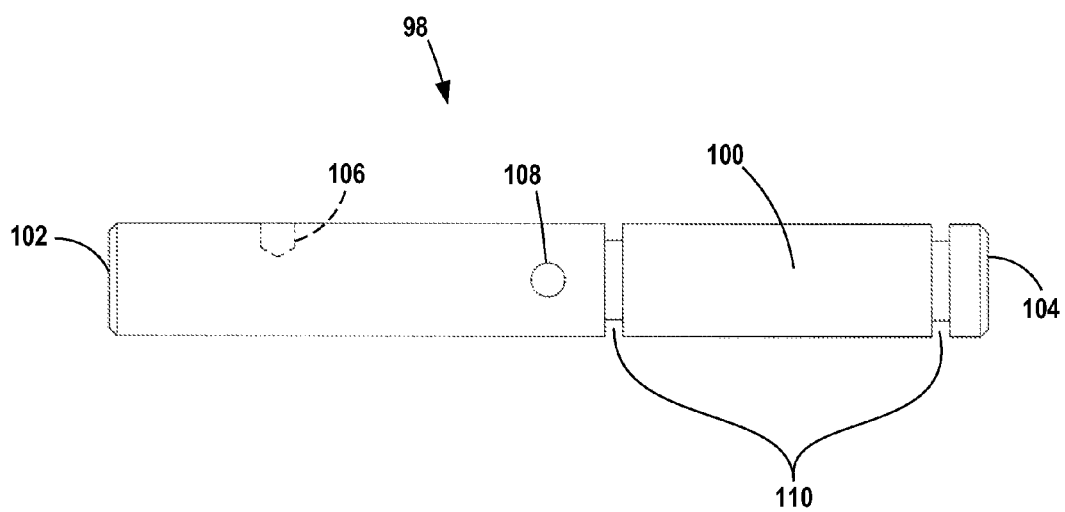
FIG. 11 is a view of a mounting post used in the invention.

FIG. 10 illustrates an alternate embodiment mounting base 204 having a body 206, top and bottom clamp assemblies 208 and 210 on one side of the body and a mounting member 212 on the other side of the body. Body 206 and clamp assemblies 208 and 210 are substantially the same as body 24 and clamp assemblies 26 and 28 described above.

Mounting post 214 extends upwardly from mounting member 212 to engage a lower support member 216 having mounting aperture 218. Shock absorber assembly 220 made up of elastomeric O-rings 222 and elastomeric collar 224 is located proximate to mounting post 214. O-rings 222 prevent direct contact between mounting post 214 and lower support member 216 and collar 224 prevents contact between mounting member 212 and lower support member 216 prevent transmission of vibrations between mounting base 204 and lower support member 216.

While the invention is described using elastomeric materials in the disclosed shock absorber assemblies, other shock absorber assemblies are also contemplated for isolating parts of the workstation, including springs, hydraulic dampers and absorbers known in the art.

The installation and use of workstation 10 will now be described.

First, a driver positions a vehicle passenger seat to expose a seat rail 12. The driver then loosens the fasteners holding the clamp plates to corresponding mounting plates to create a clamp slot appropriate to fit a seat rail arm, places the corresponding clamp assemblies over the appropriate rail arms and tightens the clamp assembly in place, initially by-hand, and then firmly with a wrench or other appropriate tool. The driver then places the lower support member mounting post into the base mounting aperture and adjusts the position of the upper support member and the support plate. When the support plate is in a desired position, the driver uses the knob fasteners to hold the support members and support plate in place. The driver then mounts a desired article of display equipment on the support plate.

During vehicle operation, vibrations and jolts generated by the vehicle are dampened by the shock absorber assembly so that display equipment on the support plate remains stable and the vibrations and jolts do not alter the positioning of the support member and the support plate.

If a passenger needs to occupy the passenger seat, the support assembly is pulled upward so that the post is removed from the mounting aperture. The passenger can sit on the passenger seat while the base remains installed on the seat rail.

If the driver needs to change vehicles, the workstation is unassembled and the base removed from the seat rail for reassembly in the new vehicle.

While I have illustrated and described preferred embodiments of my invention, it is understood that these are capable of modification, and I therefore do not wish to be limited to the precise details set forth, but desire to avail myself of such changes and alterations as fall within the purview of the following claims.

The invention claimed is:
1. A vibration resistant vehicle workstation comprising:
   A. a base adapted to be mounted on a vehicle fixture in an interior compartment of a vehicle;
   B. an equipment support member adapted to mount display equipment for use by an individual in the compartment;

C. a vertically extending support assembly having a lower end joined to the base, and an upper end joined to the equipment support member to position the equipment support member for use of the display equipment by the individual in the vehicle compartment; and D. the support assembly including a shock absorber assembly between the upper and lower ends of the support assembly, the shock absorber assembly comprising a first member connected to the base, the first member having a first support surface, a second member connected to the support member, the second member having a second support surface overlying the first support surface, a cylindrical post extending from either the first member or second member outwardly of the support surface of such member, past the support surface of the other member and into a cylindrical aperture formed in the other member, a first shock absorber between said surfaces of said members, a second shock absorber between said post and the interior of said aperture, wherein said shock absorbers support the portion of the vehicle workstation extending above the shock absorber assembly and the work station supports an electronic device for use by the operator while isolating the electronic device from vibrations transmitted from the vehicle to the base.

2. The vehicle workstation of claim 1 wherein the member surfaces are oriented horizontally and the cylindrical post extends vertically.

3. The vehicle workstation of claim 1 wherein the support assembly comprises means for limiting rotation of the first and second members around the post.

4. The workstation as in claim 3 wherein said means comprises a pin extending from either of the first member or second member into an opening in the other member wherein the pin fits loosely in the opening.

5. The workstation as in claim 4 wherein the pin extends horizontally between said adjacent members.

6. The workstation as in claim 1 wherein each shock absorber comprises an elastomeric element.

7. The workstation as in claim 6 wherein the first shock absorber comprises a collar at least partially surrounding the post.

8. The workstation as in claim 6 wherein the second shock absorber comprises one or more o-rings surrounding the post.

9. The workstation as in claim 6 wherein the second shock absorber comprises a sleeve surrounding the post.

10. The workstation as in claim 1 wherein the shock absorber assembly is proximate the base.

11. The workstation as in claim 1 comprising a second shock absorber assembly.

12. A vibration resistant vehicle workstation comprising:
a base adapted to be mounted on a vehicle fixture in the interior compartment of a vehicle; an equipment support adapted to mount display equipment for use by an individual in the compartment; a vertically extending support assembly comprising multiple support members, the support assembly having a lower end joined to the base and an upper end joined to the equipment support member to position the equipment support member for use of the display equipment by the individual in the vehicle compartment; the support assembly including a shock absorber assembly between the upper and lower ends of the support assembly, the shock absorber assembly comprising a first member, the first member having a first support surface, a second member, the second member having a second support surface overlying the first support surface, a cylindrical post extending from either of the first member or second member outwardly of the support surface of such member, past the support surface of the other member and into a cylindrical aperture formed in the other member, first shock absorption means between said surfaces of said members, second first shock absorption means between said post and the interior of said aperture, and rotation limiting means between said members wherein the work station supports display equipment for use by the operator, said first and second shock absorption means substantially isolate the display equipment from vibrations transmitted from the vehicle to the base and said rotation limiting means prevent substantial rotation of the first member relative to the second member.

13. The workstation of claim 12 wherein the rotation limiting means comprises a pin into an opening wherein the pin fits loosely in the opening.

14. The workstation of claim 12 wherein the first shock absorption means comprises an elastomeric element.

15. The workstation of claim 12 wherein the second shock absorption means comprises an elastomeric element.

16. The workstation of claim 12 wherein each shock absorption means comprises an elastomeric element.

* * * * *